Oct. 15, 1929.   C. I. BAKER   1,731,368
HOT WATER HEATING SYSTEM
Filed July 1, 1925    2 Sheets-Sheet 1

Inventor:
Charles I. Baker.
Kwis Hudson & Kent
attys.

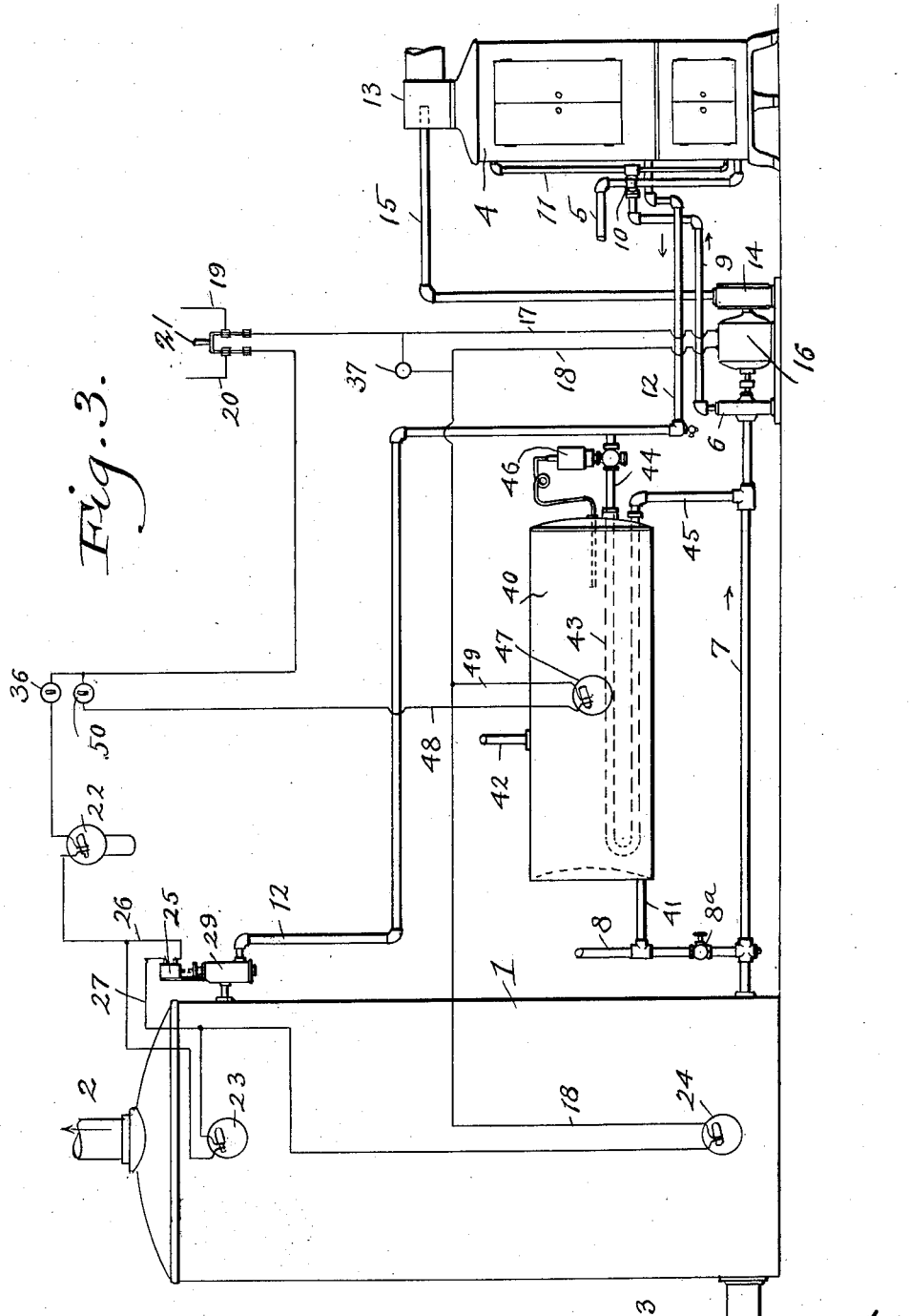

Patented Oct. 15, 1929

1,731,368

UNITED STATES PATENT OFFICE

CHARLES I. BAKER, OF NEAR GLENSHAW, PENNSYLVANIA

HOT-WATER-HEATING SYSTEM

Application filed July 1, 1925. Serial No. 40,734.

This invention relates to a hot water heating system for houses and more particularly to a hot water house heating system using a fluid fuel under automatic control.

There are some house heaters especially designed for using fluid fuel, which are quite economical in severe winter weather when operated continuously at full load. In mild weather such heating systems are usually operated with only a few of the total number of heating burners. In such cases, the entire heat absorbing surface will be kept heated, while only a portion of the total heat absorbing surface is being acted upon by the burners. Thus while only a small part of the heating surface is subjected to the heat of the burners, the remainder of the heat absorbing surface is being acted upon by the chimney draft, which causes loss of heat to the chimney, the cost of fuel necessary to maintain the chimney and heating surface in normal operating condition, under continuous natural draft, being a goodly percentage of the total fuel expense.

More specifically, the present invention provides a heating system in which the heater, while in operation, burns fuel at the full rate and the draft through the heater is discontinued when the operation of the heater ceases, so that the heat losses, due to chimney draft, are reduced to a minimum.

A further object is to provide an automatic control that will give intermittent operation with full fuel supply to the burners and avoid flashing on and off of the fuel which would occur with a control subject to temperature changes at one water level.

A further object of the invention is to provide, in connection with a hot water house heating system, means for maintaining a supply of hot water for the hot water faucets, the hot water supply system being so connected to the heater that the supply of hot water will be maintained at substantially a predetermined temperature.

With the above and other objects in view, the invention may be said to comprise the hot water system as illustrated in the accompanying drawings hereinafter described and particularly set forth in the appended claims, together with such variations and modifications thereof, as will be apparent to one skilled in the art to which the invention appertains.

Figure 1:
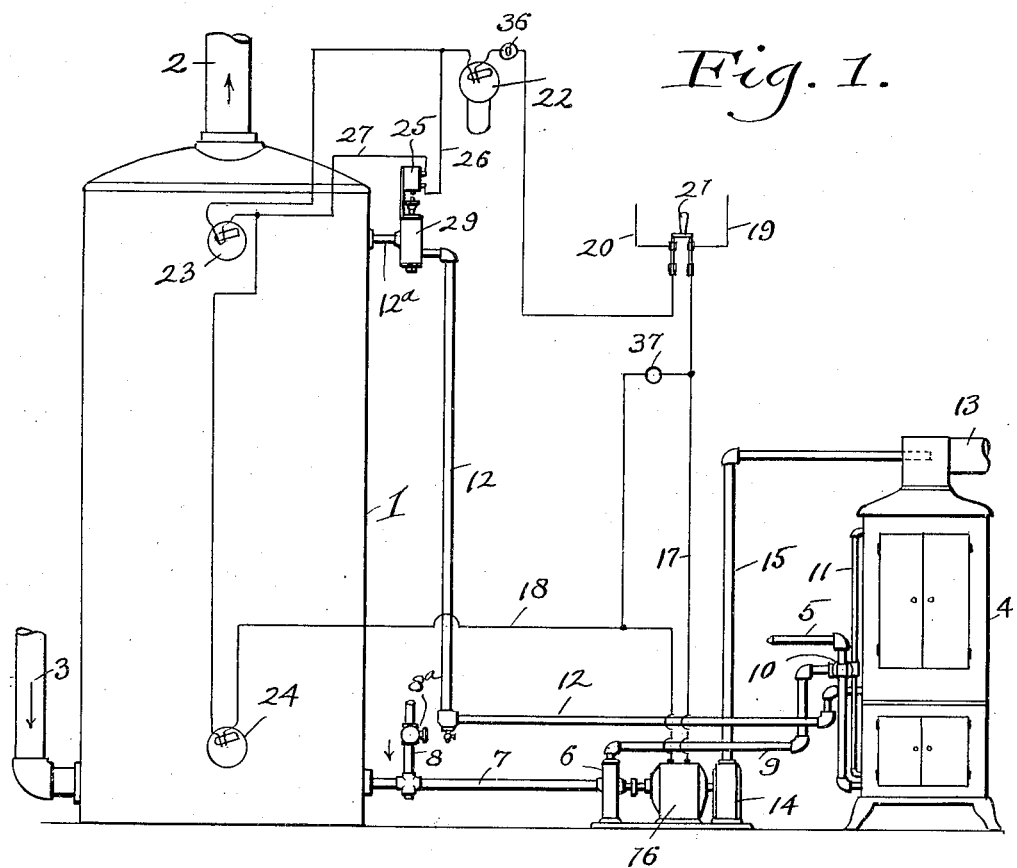
Figure 2:
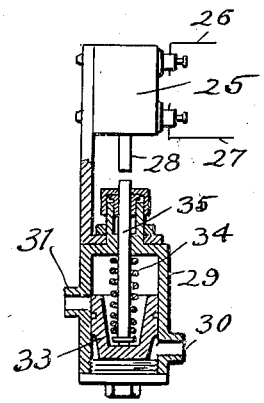

Reference should be had to the accompanying drawings, forming a part of this specification, in which, Fig. 1 is a more or less diagrammatic view showing the hot water storage tank for a hot water house heating system, the water heater and the water circulating and controlling means; Fig. 2 is a sectional view showing the flow control switch actuator; and Fig. 3 is a view similar to Fig. 1 showing the same house heating system together with an auxiliary hot water supply tank heating coil and the controlling means associated therewith.

Referring to the accompanying drawings, the numeral 1 indicates a tank for storing a quantity of hot water as a constant heat supply for room radiators, the tank 1 being provided with an outlet pipe 2 leading to the radiators from the upper end of the tank and a return pipe 3 which extends from the radiators to the bottom portion of the tank. The tank 1 may be of any suitable form and the hot water is supplied thereto from a suitable automatically controlled fluid fuel burning heater 4, which is of the type known in the art as an instantaneous automatic water heater. The coil of the heater 4 is connected to the storage tank 1 by suitable piping and may be located in the same room with the storage tank or if desired, in a separate room or in a separate building.

The heating system of the present invention may be employed alone or as an auxiliary to the ordinary coal burning hot water heating system of a house. In the latter case, pipe 2 and pipe 3, of tank 1, will be connected to the outlet and return pipes of the coal burning furnace. When used as an auxiliary heating system, the device of the present invention will operate only when the coal fire is extinguished or when the coal fire gets too low to supply the desired amount of heat.

Fluid fuel is supplied to the burners of the heater 4 through a suitable supply pipe 5, the supply of fuel to the burners being also controlled by a thermostat in such manner as to prevent the heating of the water in the coils of the heater above a certain predetermined temperature as is common practice in heaters of this type. The pump 6 is provided for circulating water through the coils of the heater 4 and through the tank 1 during the operation of the heater. A pipe 7 connects the lower portion of the tank 1 to the inlet of the pump 6 and to this pipe there is connected a water supply pipe 8 having a manually operable valve 8ª, the supply pipe 8 being connected to a suitable source of water supply and serving, when the valve 8ª is opened, to replenish any loss of water in the heating system. The outlet of the pump 6 is connected by a pipe 9 through a flow motor 10 and a pipe 11 with the inlet end of the coil of the heater 4. The flow motor 10 operates a valve in the pipe 5 to open the supply of fuel to the burner, due to the operation of the pump 6, the flow motor as well as the usual thermostatic control being well-known in the art and commonly employed in automatically operated gas water heaters. The outlet end of the coil of the heater is connected through a pipe 12 with the upper portion of the tank 1. During the operation of the heater the pump 6 is operated and draws water through the pipe 7 from the lower portion of the tank 1 and forces the water through the coil of the heater and through the pipe 12 to the upper portion of the tank 1.

The heater 4 is provided with an outlet vent 13 and the draft through this outlet vent is preferably produced mechanically and during the operation of the heater only by means of a blower 14, which has a discharge pipe 15 extending into the outlet vent 13.

The pump 6 and blower 14 are simultaneously operated by an electric motor 16 which is automatically controlled by means which will be presently described, the control for the motor 16 therefore controlling the fuel for the heater 4 by the flow motor 10 and the draft through the heater by the blower 14.

Current is supplied to the motor through lines 17 and 18 which are connected to suitable supply lines 19 and 20 through a manually operable knife switch 21, the line 17 extending directly to the motor and the line 18 having in series therein, thermally controlled switches 22, 23 and 24 and a starting switch 36, there being also a fourth automatically controlled switch 25, which is in parallel with the switch 23. The switch 22 is operated by a suitable thermostat which is responsive to variations in temperature in one of the rooms of a house and the switches 23 and 24 are controlled by suitable thermostats responsive to variations in temperature in the upper and lower portions, respectively, of the tank 1. The thermostatically operated switches are of well-known construction, being capable of adjustment to close or open the switch at a desired temperature. The switch 22 will be set to open at a temperature at which it is desired to maintain the room in which it is located. The switch 23 will be set to close when the temperature of the water at the top of the tank falls below a predetermined temperature (in ordinary operation about 160°). The switch 24 will be set to open when the temperature of the water in the bottom of the tank is raised to a predetermined temperature (in ordinary operation substantially 180°).

The switch 25 is normally open but is automatically closed upon flow of water through the pipe 12, due to the operation of the pump 6. The terminals of the switch 25 are connected by lines 26 and 27 with the line 18 on opposite sides of the switch 23 in parallel with switch 23 and in series with switches 22 and 24. The switch 25 is an ordinary snap switch having an outwardly projecting spring operated member 28 which, in its outermost position, opens the switch and when pushed inwardly, closes the switch. The switch 25 is operated by a flow motor interposed in the pipe 12 and comprising the casing 29 having an inlet 30 and an outlet 31, the inlet 30 being connected to the pipe 12 and the outlet 31 being connected to a short pipe 12ª extending from the tank 1. Within the casing there is arranged a plunger 33 which is adapted to be moved in one direction by the pressure of water flowing through the casing from the inlet 30 to the outlet 31 and in the opposite direction by a spring 34. The plunger 33 has a stem 35 projecting through the top of the casing and in alignment with the operating member 28 of the switch 25. The movement of the plunger 33 in response to the flow of water to the storage tank 1, causes the stem 35 to engage the switch operating member 28 and push the same to switch closing position.

Assuming that the current supply switch 21 is closed and the temperature in the room in which the switch 22 is located and of the water in the top and bottom of the tank is low enough to cause the switches 22, 23 and 24 to be held in closed position, the motor 16 may be started by closing the manually operated starting switch 36. When the motor 16 is operated, the pump 6 and blower 14 will be driven, causing water to circulate through the coil of the heater and causing a draft to be produced in the heater. The flow of water through the pipe 9 and flow motor 10 causes the fuel valve to be opened to supply fluid fuel to the burners, which are automatically ignited by suitable means such as the small pilot light commonly employed in heaters of this type. The water heater and water circulating means are thus simultaneously started in operation so that the hot water from the heater 4 is delivered through the pipe 12 into the upper portion of the tank 1. The flow of water through the flow motor 29 shifts the plunger 33 and causes the switch 25 to be closed so that the control switch 23, in the upper portion of the tank 1 is short circuited and may be opened by an increase in the temperature of the water in the top of the tank without breaking the motor circuit. The switch 25 will remain closed as long as the motor 16 is operated and the motor will remain in operation until either the switch 22 or the switch 24 is opened. As long as the temperature in the room remains below that at which the switch 22 is set to open, the motor will continue to operate until the water in the bottom of the tank has reached the temperature at which the switch 24 is set to open. When the motor circuit is broken, either by the switch 24 or by the switch 22, the flow of perature about the room switch 22 and the switch 25 will be opened. As soon as the temperature about the room switch 22 and the temperature at the top of the tank 1 are low enough to cause the switches 22 and 23 to close, the motor circuit will be again closed causing the operation above described to be repeated. The heater and water circulating means are automatically operated to impart a predetermined temperature to the water in the tank 1 and when this temperature is attained, the heater and water circulating means are automatically rendered inoperative until there has been a predetermined drop in the temperature of the water.

When the heating system above described is employed as an auxiliary to a coal fired furnace, the operation is exactly the same except that when the furnace is operated at sufficient capacity to maintain the room temperature switch 22 open, it will prevent the operation of the heater 4. If the fire in the coal furnace should become low, the room temperature and the temperature of the water in the tank 1 will drop sufficiently to close the switches 22, 23 and 24 and start the pump, blower and heater into operation. The heating system of the present invention, when used as an auxiliary to a coal burning system, may be conveniently used in the mornings for heating the house before the coal fire is attended to and provides a heating means more economical than a coal furnace for heating the house in cool or chilly weather in the spring and fall.

A signal lamp 37, at a convenient place in the house, will be connected across the motor 16 and will be lighted during operation of the motor indicating that the gas water heater is in operation. Where the gas water heater is used as an auxiliary to a coal furnace, it will be automatically put into operation by the closing of room switch 22 whenever the temperature of the room falls below that for which the switch 22 is set to close. Under these conditions the lighting of the signal lamp will indicate that the gas water heater is operating and that the coal fire is not supplying the necessary heat and should be attended to.

Fig. 3 of the drawing shows exactly the same heating system as above described, with the addition of an auxiliary heating tank for maintaining a supply of hot water for household use. The various parts of the house heating system are designated by the same reference numerals as in Fig. 1 since there is no change in the operation of these parts. The hot water supply tank, which is indicated by the reference numeral 40, is connected with the water supply pipe 8 by a pipe 41, the connection of the pipe 41 to the pipe 8 being above the valve 8ª, so that the tank 40 is in constant communication with the source of water supply. The tank 40 also has an outlet pipe 42 which leads to the various hot water faucets in the house. The water in the tank 40 is heated by a suitable hot water coil 43 within the tank, the inlet end of which is connected by a pipe 44 with the pipe 12 leading from the heater 4 to the tank 1 and the outlet end of which is connected by a pipe 45 with the pipe 7 which leads from the lower portion of the tank 1 to the inlet opening of the pump 6. The pump 6, in its operation, causes the hot water to be circulated from the pipe 12 through the coil 43 and through the pipe 45 to the pipe 7 leading to the inlet of the pump. A thermally controlled valve 46 is provided in the pipe 44, this valve being adapted to automatically cut off the flow of water through the coil 43 when the water within the tank 40 reaches a predetermined temperature. The automatic valve 46 is not illustrated in detail herein, valves of this type being well known in the art and the valve shown herein being known as a sylphon temperature regulator. Independent means is preferably provided for automatically controlling the heater 4 and motor 16 to maintain a supply of hot water in the tank 40 and to this end a thermally controlled switch 47 is mounted on the tank 40 and connected by a line 48 to the line 18 between the switches 36 and 21 and by a line 49 to the line 18 between the switch 24 and motor 16. In order to operate the heater and motor to heat the water in the tank 40, when the heating system is not operating, a starting switch 50 is placed at a suitable point in the line 48. Since the switches 47 and 50 are arranged in parallel with the other controlling switches the motor 16 may be controlled automatically by the switch 47 and independently of the controlling switches associated with the house heating system. The switch 47 is preferably set to close at a temperature lower than the switches 23 and 24, associated with the tank 1, and the regulator 46 is set to cut off the supply of water to the heating coil 43 at a temperature slightly higher than the temperature for which the switch 47 is set. If the temperature of the water in the tank 40 falls below the temperature for which the regulator 46 is set during the operation of the heater to supply hot water to the main tank 1, the regulator valve will be opened permitting hot water to flow through the coil 43 to supply heat to the water in the tank 40.

When it is desired to heat the water in the hot water supply tank 40 independently of the main tank 1, as for instance in warm weather, the switch 50 will be closed while the switch 36 remains open. Under these conditions the heater will be under the control of thermostatic switch 47 and will operate until the water in the tank 40 is raised to the temperature for which the switch 47 is set to open.

Having described my invention, I claim:

1. In an automatic water heating system, a pump and piping for circulating water through said system, a heater through which the water passes, means for operating the pump, and means acting automatically to start the operation of the pump when the water at one point in the system becomes cooled to a predetermined temperature and to stop the operation of the pump when the water at another point in the system is heated to a predetermined temperature.

2. In an automatic water heating system, a pump and piping for circulating water through said system, a heater through which the water passes, an electric motor for operating the pump, and means controlling the operation of the motor comprising a pair of switches in series with each other in the motor circuit and controlled by the temperature of the water at different points in the system and a flow controlled switch in parallel with one of the first mentioned switches.

3. In an automatic water heating system, a pump and piping for circulating water through said system, a heater through which the water passes, means for operating the pump, electrical means for controlling the operation of the pump and heater comprising a circuit having a pair of switches in series and having thermally controlled actuators responsive to temperature of the water at different points in said system and set to operate at the same temperatures, and flow controlled means for rendering one of said switches ineffective to control the operation of the pump.

4. An automatic water heating system comprising a water container, a water heater, a water pump and piping for circulating water through the container and heater, a motor for operating the pump, means responsive to temperature variations in the water at the top of the container for controlling the starting of the motor, and means responsive to temperature variations in the water at a lower level in the container for stopping the motor.

5. An automatic water heating system comprising a water container, a water heater, a water pump and piping for circulating water through the container and heater, means for controlling the operation of the pump and heater comprising an electric circuit having a thermally controlled switch adapted to be closed when the water at the top of the container is cooled to a predetermined temperature, a thermally controlled switch in series with the first switch and adapted to be opened when the water at a lower level in the container is heated to a predetermined temperature and a switch in parallel with the first-mentioned switch and adapted to be closed by flow of water through said piping.

6. An automatic water heating system comprising a water container, a water heater, a water pump and piping for circulating water through the container and heater, means for controlling the operation of the pump and heater comprising an electric circuit having a thermally controlled switch adapted to be closed when the water at the top of the container is cooled to a predetermined temperature, a thermally controlled switch in series with the first switch and adapted to be opened when the water at a lower level in the container is heated to a predetermined temperature, and a fourth switch in series with the other switches and controlled by the temperature of the surrounding air.

7. An automatic water heating system comprising a storage tank, a water heater having self-contained fuel control, a pump and piping for circulating water through said heater and tank, an electric motor for operating said pump, an electric circuit for said motor, and automatically operated means for closing said circuit when water in the upper part of said tank is cooled below a predetermined temperature, for maintaining said circuit closed until water in the lower part of said tank is heated to a predetermined temperature, and for then opening said circuit.

8. An automatic storage water heating system, comprising a tank, a heater, a water pump and piping connecting said tank and heater for circulating water through said tank and heater, a blower for creating an induced draft for said heater, and automatically controlled means for operating said pump and blower when water in the top of said tank is at or below a predetermined temperature, for maintaining operation thereof until water at a lower level in said tank is heated to a predetermined temperature, and for then stopping said pump and blower.

9. The combination with a hot water heating system having water containing and conducting means through which water may circulate in a closed path, of a fluid fuel heater, means for producing a mechanical induced draft through the heater, and means including devices responsive to the temperature of the water at different points in the system for automatically controlling said heater and draft producing means to operate the heater at full capacity and to simultaneously operate the draft producing means when all of the water is below a certain temperature and to stop the operation of the heater and draft producing means when all of the water is above a predetermined temperature.

10. An automatic storage water heating system, comprising a storage tank, a heater, a water pump and piping connected for circulating water through said tank and heater, an electric motor for operating said pump, a controlling circuit for the motor having three automatically operated electric switches therein, one switch being thermally controlled and positioned adjacent the top of said tank for closing said circuit, the second being thermally controlled and positioned adjacent the bottom of said tank for opening said circuit and the third switch being in parallel with the first-mentioned switch, and means for automatically closing said third switch after said circuit is completed and for automatically opening the same after said circuit has been broken.

11. An automatic storage water heating system comprising a storage tank, a heater, a water pump and piping connected for circulating water through said tank and heater, a blower for creating an induced draft for said heater, an electric motor for operating said pump and blower, a controlling circuit for the motor having three automatically operated electric switches therein, one switch being thermally controlled and positioned adjacent the top of said tank for closing said circuit, the second being thermally controlled and positioned adjacent the bottom of said tank for opening said circuit and the third switch being in parallel with the first-mentioned switch, and means for automatically closing said third switch after said circuit is completed and for automatically opening the same after said circuit has been broken.

12. An automatic water heating system, comprising a tank for storing heated water, an automatic water heater for heating water, a pump with piping for drawing water from the bottom of said tank and forcing the water through said heater and returning it to the top of said tank, an electric motor for operating said pump, a wiring circuit for said motor containing four automatically operated switches three of which are in series, the first switch being operated by the temperature of surrounding air, the second switch being operated by the temperature of the water in the upper part of said tank, the third switch being operated by the pump circulated water and connected in parallel with said second switch, and the fourth switch being operated by the temperature of the water in the lower part of said tank.

13. An automatic water heating system, comprising a tank for storing heated water, an automatic water heater for heating water, a pump with piping for drawing water from the bottom of said tank and forcing the water through said heater and returning it to the top of said tank, a blower for creating an induced draft for said heater, an electric motor for operating said pump and blower, a wiring circuit for said motor containing four automatically operated switches three of which are in series, the first switch being operated by the temperature of surrounding air, the second switch being operated by the temperature of the water in the upper part of said tank, the third switch being operated by the pump circulated water and connected in parallel with said second switch, and the fourth switch being operated by the temperature of the water in the lower part of said tank.

14. An automatic storage water heating system, comprising a water container, an automatic fluid fuel water heater, a motor-pump unit with piping for circulating water through said heater and container, an electric circuit for said motor provided with switches, and automatically controlled means for opening and closing said switches to operate the motor until practically all the water in said container is heated to a predetermined temperature, and to again operate the motor only after practically all the water in said container has been displaced by water at a predetermined lower temperature.

15. An automatic water heating system, comprising a container for water, a water heater having automatic fuel control, a water pump and piping for circulating water through said heater and container, an electric motor for operating said pump, a controlling circuit for the motor having controlling switches therein, and automatically controlled operating means for closing said circuit and maintaining a closed circuit until a substantially predetermined amount of heat has been imparted to the water in said container and for then opening said circuit and maintaining an opened circuit until a predetermined amount of heat has passed from said container.

16. An automatic water heating system comprising two storage tanks, a water heater, a water pump and piping for moving hot water from the heater to the tanks, and automatic means for controlling the pump and heater including temperature responsive devices associated with the two tanks for independently controlling the operation of the pump and heater upon predetermined temperature variations in either tank.

17. An automatic water heating system comprising a storage tank, a water heater, a pump and piping arranged for circulating water through said tank and heater, and means acting automatically to operate the pump when the water at one level in the storage tank is below a predetermined temperature and to maintain the pump in operation until water at another level in the storage tank is above a predetermined temperature.

18. An automatic water heating system comprising a main storage tank and a secondary storage tank having a heating coil, a water pump and piping arranged for circulating water through said heater and said heating coil or for circulating water through said heater and said main storage tank, means responsive to the temperature of the water in said secondary storage tank for stopping water circulation through said heating coil, an electric motor for operating said pump, and an electrical controlling means for starting and stopping said motor in response to temperature changes in either of said tanks.

19. An automatic water heating system comprising a main storage tank, a secondary storage tank, a water heating coil for heating water in said secondary storage tank, a temperature operated valve for controlling the flow of heated water through said heating coil, a water heater having automatic fuel control, a water pump and piping for circulating water through said heater and said first mentioned tank or through said heater and said heating coil, an electric motor for operating said pump, and means for controlling the supply of current to the motor including two temperature controlled switches associated with the main tank, a temperature controlled switch associated with the secondary storage tank, a room temperature controlled switch, and a switch operated by the flow of water in said piping, said temperature controlled switches being in series, said flow controlled switch being in parallel with one of the two switches associated with the main storage tank, and the switches associated with the second storage tank being connected with the motor to control the same independently of the other switches.

20. An automatic storage water heating system comprising a main storage tank, a water heater having automatic fuel control, a pump and pipes connecting the pump, heater and tank, whereby water may be circulated through said heater and tank, a secondary tank having a water heating coil therein connected to said pipes whereby water from the heater may be circulated through said coil, means responsive to the temperature of the water in the secondary tank for restricting the flow of water through said coil when the water in the secondary tank is sufficiently heated, automatic means for operating said pump when water in the upper part of said main tank is cooled to or below a predetermined temperature and for stopping operation of said pump when the water in the lower part of the main tank is heated to a predetermined temperature, and auxiliary means for causing operation of said pump to circulate hot water through said heating coil.

21. An automatic water heating system comprising two storage tanks, one arranged as a source of heat supply and the other having a heating coil and arranged as a source of hot water supply, a water heater, a water pump and piping for circulating water through said heater, said heat supply tank, and said heating coil in the hot water supply tank, an electric motor for operating said pump, means controlled by variations in the water temperature in either of the tanks for starting and stopping the motor, and a temperature operated valve for stopping water circulation through said tank having a heating coil.

In testimony whereof, I hereunto affix my signature.

CHARLES I. BAKER.